No. 805,066. PATENTED NOV. 21, 1905.
H. K. HITCHCOCK.
GLASS PRESS.
APPLICATION FILED JUNE 4, 1903.
4 SHEETS—SHEET 3.
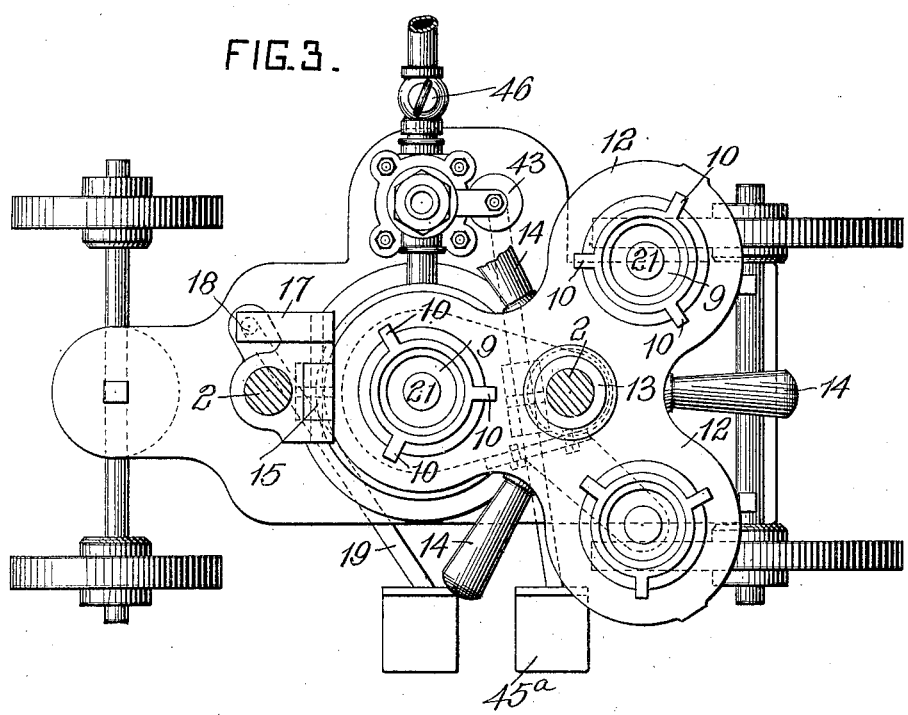
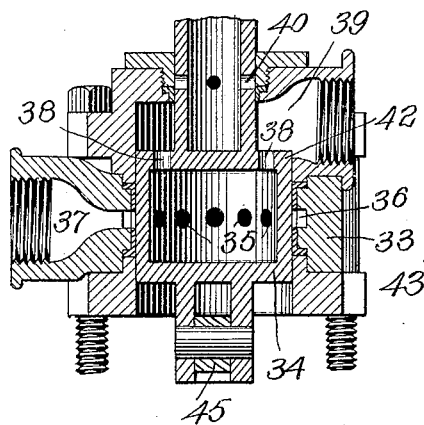
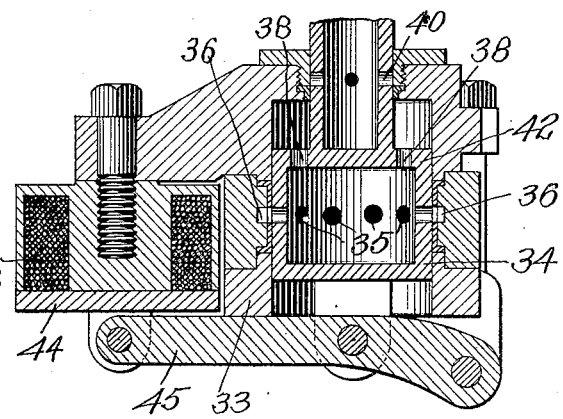
WITNESSES:
Herbert Bradley.
Jas. G. Mahony.
INVENTOR
Herbert K. Hitchcock
by
Christy & Christy, Att'ys.

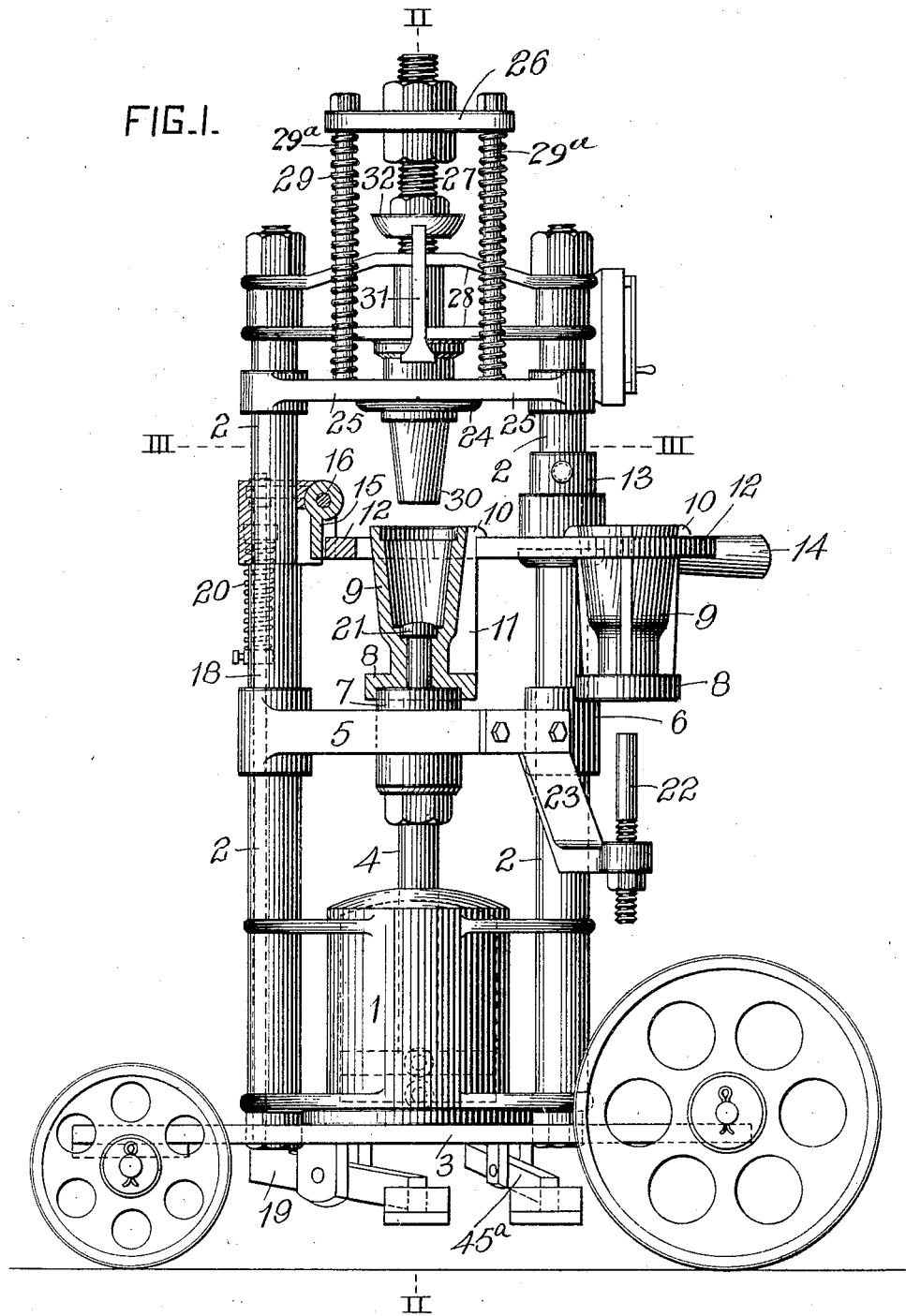

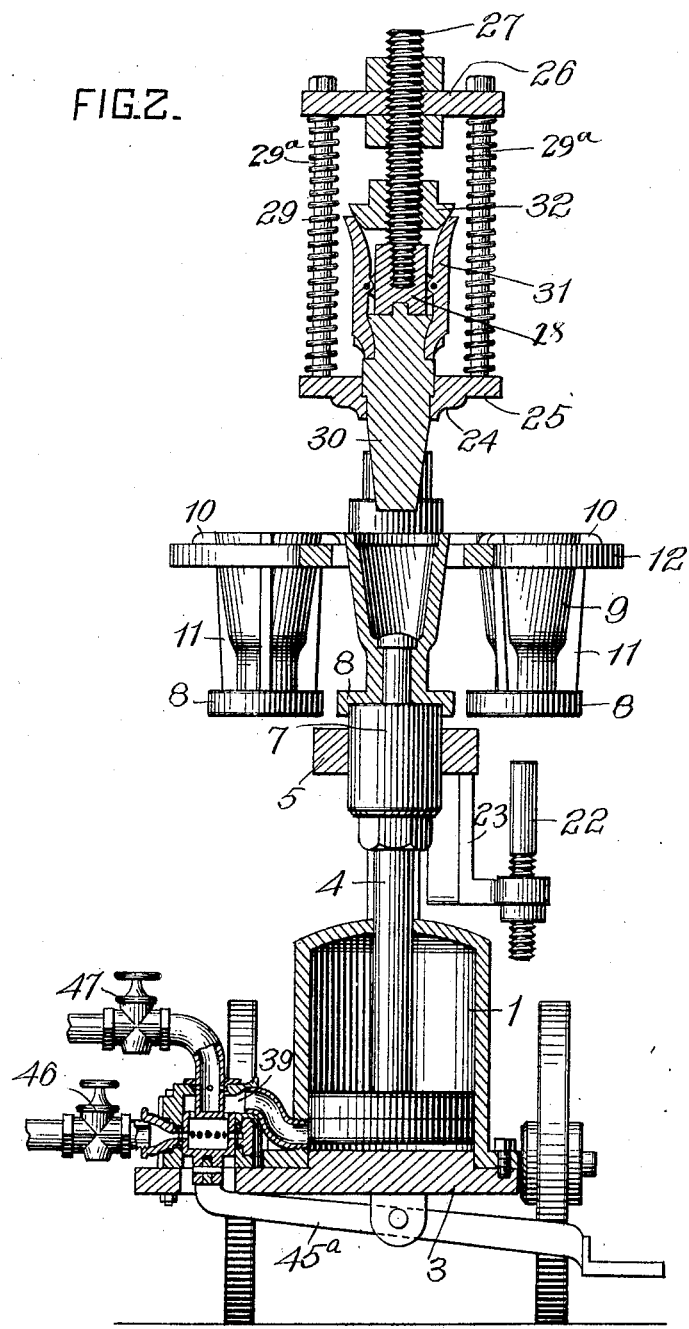

No. 805,066. PATENTED NOV. 21, 1905.
H. K. HITCHCOCK.
GLASS PRESS.
APPLICATION FILED JUNE 4, 1903.

4 SHEETS—SHEET 4.

WITNESSES:
INVENTOR
Halbert K. Hitchcock
by Christy & Christy, Att'ys.

UNITED STATES PATENT OFFICE.

HALBERT K. HITCHCOCK, OF AKRON, OHIO.

GLASS-PRESS.

No. 805,066. Specification of Letters Patent. Patented Nov. 21, 1905.

Application filed June 4, 1903. Serial No. 159,998.

*To all whom it may concern:*

Be it known that I, HALBERT K. HITCHCOCK, a citizen of the United States, residing at Akron, in the county of Summit and State of Ohio, have invented or discovered certain new and useful Improvements in Glass-Presses, of which improvements the following is a specification.

The invention described herein relates to certain improvements in glass-presses, and has for its object a construction of pressing mechanism whereby the glass in the mold will be subjected to a certain predetermined pressure, and as soon as such pressure has been attained there will be a release or cessation of all pressure which would be effective on the glass.

The invention is hereinafter more fully described and claimed.

Figure 6:
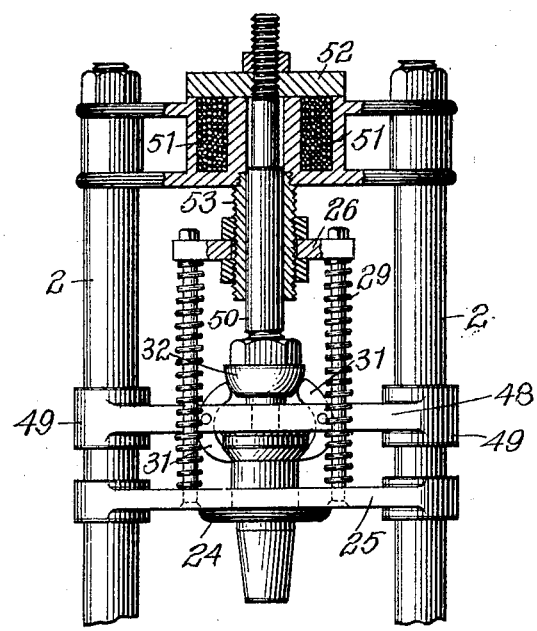
Figure 7:
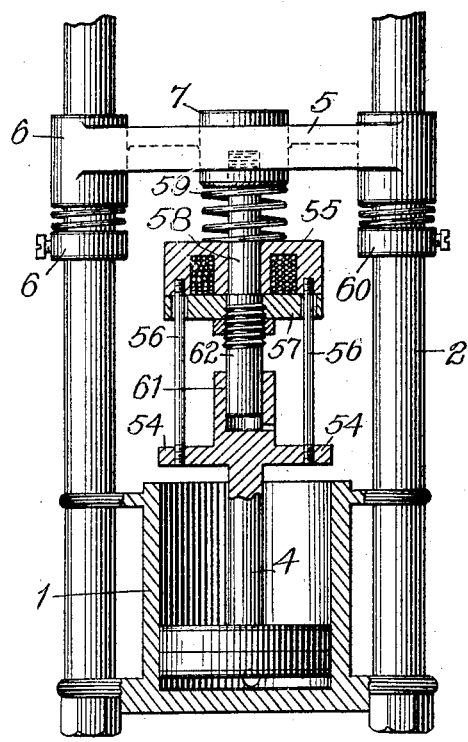
Figure 8:
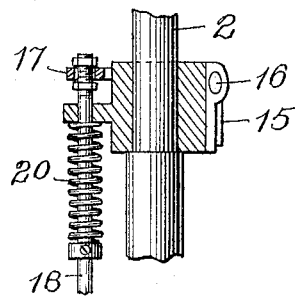

In the accompanying drawings, forming a part of this specification, Figure 1 is a view, partly in elevation and partly in section, of a press embodying my invention. Fig. 2 is a sectional elevation of the same, the plane of section being indicated by the line II II, Fig. 1. Fig. 3 is a sectional plan view, the plane of section being indicated by the line III III, Fig. 1. Figs. 4 and 5 are sectional detail views, on an enlarged scale, of the valve mechanism, the sections being in planes at right angles to each other. Fig. 6 is a view showing the release mechanism applied to the plunger. Fig. 7 is a view, partly in section and partly in elevation, showing the release mechanism applied to the connection between the power and the part moved thereby; and Fig. 8 is a detail view showing the mechanism for operating the table detent or catch.

It will be readily understood by those skilled in the art that as regards the broader features of my improvements the power mechanism can be applied to either the mold or plunger. Under the term "power mechanism" as hereinafter employed any suitable known means whereby the desired movement can be imparted to the movable portion of the press is expressly included. A convenient and desirable means for shifting the movable part of the press consists of the fluid-pressure cylinder 1, which in the construction or form of press selected to illustrate my invention is secured to posts or standards 2, near their lower ends, said standards being secured to a bed-plate 3. The rod 4 of the piston of the cylinder is connected to a cross-head 5, provided with guide-sleeves 6, surrounding the posts or standards 2. This cross-head is provided with suitable means whereby it may engage and center the molds when raising the same—as, for example, a boss or projection 7 may be formed on the cross-head adapted to enter a socket 8 or engage any suitable seat on the lower ends of the molds 9. These molds are provided at their upper ends with lugs or ears 10, which rest upon the edges of openings in a table 12, adapted to move the molds into and out of operative position. It is preferred to form the lugs or ears at the upper ends of radial ribs 11, extending down along the molds and serving to center the same in the openings in the table and also to strengthen the molds laterally.

A rotary table is preferably employed for carrying the molds, and to this end the table 12 is mounted on a sleeve 13, adjustably secured on one of the posts or standards 2, so that in the rotation of the table, which is provided with handles 14 for the rotation thereof, a mold can be shifted into operative position simultaneously with the movement of another mold from such position.

Any suitable form of catch may be used for stopping the table when any of the molds have reached operative or pressing position—such, for example, as that shown consisting of a dog 15, attached to a pin 16, mounted in bearings on one of the posts 2, said pin being provided with an arm 17, having its outer end connected by a rod 18 to a treadle 19 or other suitable operating means. The dog is normally held to engage notches in the table 12 by a spring 20, bearing at its ends against a guide-arm projecting from the post or standard and a collar on the rod.

In order to remove the finished article from the mold, the latter is provided with a movable bottom 21. As the table is rotated, the molds are brought in succession over a finger 22 on the bracket 23, secured to the movable cross-head, so that when the latter is raised to press an article in one of the molds the finger 22 will raise a finished article from another mold.

The mold-ring 24 is formed on or secured to a cross-head 25, having sleeves loosely surrounding the posts 2. This cross-head is supported by rods 29ª, attached thereto and extending up through openings in a plate 26 and having nuts thereon which rest on the plate 26, and so support the cross-head 25. The plate 26 is adjustably secured on the threaded rod 27, attached to the cross-head 28, which in turn is secured to the upper ends of the posts 2. Springs 29 surround these rods 29ª and yieldingly hold the mold-ring on the mold when the latter is raised. The plunger 30 is detachably connected to the cross-head 28 by any suitable means—as, for example, by clamping-arms 31, pivotally mounted on the cross-head 28. The lower ends of these arms are constructed to grip the plunger when their upper ends are forced apart by the conical nut 32 on the threaded rod 27.

In order to prevent the glass being subjected to pressure in excess of that required for the shaping of the glass in the mold, or, in other words, to render the press capable of delicacy of operation similar to that of a hand-press, I provide means operative when the pressure on the glass has reached a predetermined point, or, in other words, when the resistance to the upward movement of the mold in the form of machine shown has reached a predetermined point, to cut off the flow of fluid-pressure to the cylinder and open an exhaust-port, permitting the flow of fluid from the cylinder and the return of the piston, cross-head 5, and mold to normal position. A suitable and desirable form of valve mechanism for this purpose is shown in Fig. 2, and on an enlarged scale in Figs. 4 and 5. This mechanism consists of a case or shell 33, in which is arranged the hollow valve 34, having its side walls perforated, as at 35, said perforations registering when the valve is in operative position with a groove 36, formed in the side walls of the shell 33 and connected to the inlet-port 37. The chamber in the valve 34 is also provided with perforations, as at 38, whereby the fluid in the chamber can flow to the port or passage 39, leading to the cylinder 1.

By reference to Figs. 4 and 5 it will be seen that as long as the perforations 35 are in register with the groove 36 fluid-pressure will flow to the cylinder and that when said valve is shifted so that the perforations are no longer in register with the groove the flow of fluid-pressure is cut off. The movement of the valve cutting off fluid-pressure from the cylinder brings ports 40 in the tubular extension of the valve into line with the port or passage 39, thereby allowing fluid-pressure to escape from the cylinder, the tubular extension having its outer end open. It will be observed the valve 34 and the valve case or shell are so constructed and arranged that some portion of the valve, as the shoulder 42, is subjected to same pressure as that existing in the cylinder 1 and that such pressure is exerted in such direction as to tend to shift the valve down or in a direction to move the perforations 35 out of alinement with the groove 36, or, in other words, to cut off the flow of fluid-pressure to the cylinder and to permit the exhaust of fluid therefrom. The movement of the valve by the pressure exerted on the shoulder 42 until the pressure in the cylinder has attained a certain maximum amount may be prevented by many forms of automatic release mechanisms which will readily suggest themselves to the skilled mechanic, and hence as regards the broader claims for this portion of my improvement I do not limit myself to any specific form or construction. A desirable form of release mechanism consists of an electromagnet whose holding power may be regulated and its armature, one of said parts being connected to the valve and the other part suitably supported. In the construction shown the electromagnet 43 is secured to the case or shell 33, as shown in Fig. 5, and its armature 44 is connected to the lever 45, which is also connected to the valve 34. It will be readily understood that the magnet will hold the valve in operative position until the pressure on the valve exceeds the pull of the magnet and that as soon as such pressure reaches the prescribed amount the armature will be forced away from its magnet and the valve shifted, thereby relieving the piston of the cylinder 1 of all operative pressure. The inflow of fluid-pressure into the cylinder by a valve 46 in the supply-pipe thereby regulates the rate of movement of the piston in the cylinder 1. The exhaust from the cylinder can be regulated by a valve 47, thereby preventing too quick a downward movement of the piston and consequent sucking of the glass by the plunger. The valve 34 may be returned to position to close the exhaust and open the inlet when it is desired to press another article by any suitable means—as, for example, by a treadle 45ª. As soon as the armature 44 comes into the field of influence of the magnet the latter will complete the movement of the valve and hold it in such position until the maximum pressure has been exerted on another article.

The release of pressure on the glass can be effected by an automatic release or "let-go" connection between the actuating power and the glass-shaping part moved thereby or between the stationary glass-shaping part or device and its support. While many forms of release mechanism between the actuating motor and the movable glass-shaping part or between the stationary part and its support will readily suggest themselves to the skilled mechanic, I prefer the construction shown in Figs. 6 and 7, but do not as regards the terms of the broader claims limit myself to such construction.

In Fig. 6 only the upper portion of the press is shown, the lower portion having the mold, and its lifting mechanism being of any suitable construction—such, for example, as that shown in Figs. 1 and 2—or a mold-lifting mechanism having a uniform movement or constant stroke may be employed. The plunger-carrying cross-head 48, which is provided with guide-sleeves 49, loosely surrounding the posts or standards 2, is connected to the lower end of a rod 50. This rod extends up through the electromagnet 51 and has the armature 52 of said magnet secured to its upper end. The plate 26, which supports the cross-head 25, carrying the mold-ring, is adjustably supported on the sleeve 53, surrounding the rod 50. As the cross-head 48 is movable on the posts 2, the plunger carried by said head is held from upward movement during the pressing operation by the pull of the magnet on its armature. Hence whenever the upward pressure on the plunger exceeds the pull of the magnet the armature will be raised away from the magnet, so that the glass in the mold will be free from pressure except that due to the weight of the plunger and the parts carried thereby.

In the construction shown in Fig. 7 the rod 4 of the piston of the cylinder 1 has a plate or arms 54 secured to its upper end, and the plate or arms are connected to the electromagnet 55 by rods 56, which pass loosely through holes in the armature 57. The mold-lifting cross-head 5 is connected to the armature 57 by a rod 58 passing loosely through the core of the magnet. In such a construction the cross-head 5 will be raised by the piston only when the magnet is excited sufficiently to hold the armature in position, and when the cross-head meets sufficient resistance to overcome the pull of the magnet further upward movement of cross-head will cease, although the piston and the magnet may continue their upward movement. In order to bring the armature into operative relation to its magnet, a spring 59 is interposed between the cross-head and magnet. While the spring may be of sufficient strength to enable the continuance of some degree of pressure on the glass while the piston completes its stroke after the release mechanism has operated, its main function is to raise the cross-head relative to the magnet, and thereby bring the armature into the attractive influence of the magnet. This restoration of the parts to operative relation may be effected by stops 60 on the posts 2 to support the cross-head 5 when at the lower limit of its movement. As the piston moves down the cross-head 5 will move with it until arrested by the stops, so that the continued movement of the piston will bring the magnet down to the armature. A cushion for the armature and cross-head may be employed, if desired, said cushion being formed by an open-ended cylinder 61, having an outlet-port at its lower end, and a plunger 62, secured to the armature, the cylinder being mounted on the plate 54.

It will be readily understood by those skilled in the art that one, two, or all three of the release mechanisms may be employed on the same press, if desired; but as a general thing only one or at most two of the release or "let-go" devices will be required. While I have shown and described my improvements as applied to a press in which the mold is forced up to effect the shaping of the glass, they are equally applicable to presses in which the plunger is shifted, one form of press mechanism being merely a reversal of the other.

It is characteristic of my invention that the operation of the release mechanism is controlled by and wholly dependent for its operation on the production of a predetermined pressure on the glass in the mold and is entirely independent of the travel or movement of the movable part or member of the pressing mechanism. It is also characteristic of the invention that the glass is freed from all shaping pressure immediately on the attainment of a certain predetermined shaping pressure.

It will be understood that by varying the current flowing through the magnets the pressure to be exerted on the glass may be varied, regardless of the force which may be applied to the movable part of the press. As will be readily understood by those skilled in the art, the pressure to be exerted on the glass may be varied by means of a rheostat placed in the circuit of the magnets.

It will be observed that the molds are so mounted in the table that they can have considerable lateral movement independent of the table, thereby permitting of the accurate centering of the molds by the mold-shifting mechanism.

I claim herein as my invention—

1. In a glass-press the combination of a mold, a shaping-plunger, a motor for moving at least one of said two members, and a release or "let-go" mechanism automatically operative on at least some one of said three members at a predetermined pressing pressure, whereby on the attainment of the desired pressing pressure the same is wholly or substantially removed, substantially as set forth.

2. In a glass-press, the combination of a mold, a shaping-plunger, a motor for moving at least one of said two members and a release or let-go mechanism in the connection between the motor and the part moved thereby and automatically operative at a predetermined pressing pressure, whereby on the attainment of the desired pressing pressure the same is wholly or substantially removed, substantially as set forth.

3. In a glass-press, the combination of a mold, a shaping-plunger, a release or "let-go" mechanism forming a part of the connection between one of said members and the portion of the press to which said part is connected, said release or "let-go" mechanism being automatically operative at a predetermined pressing pressure to wholly or substantially relieve the article from pressure, and a motor for moving one of said glass-shaping members, substantially as set forth.

4. In a glass-press, the combination of a mold, a shaping-plunger, a fluid-pressure cylinder and piston for moving one of the glass-shaping members, a valve mechanism controlling the flow of fluid-pressure to and from said cylinder and means automatically operative at a predetermined pressure for shifting said valve to release the pressure in the cylinder, substantially as set forth.

5. In a press, the combination of a mold, a shaping-plunger, a fluid-cylinder and piston for moving one of said shaping members, a valve controlling the flow of fluid-pressure to and from the cylinder and subjected to the fluid-pressure in the cylinder to shift it in one direction and an electromagnet for holding it as against movement by such fluid-pressure, substantially as set forth.

6. In a glass-press, the combination of a mold, a shaping-plunger, a fluid-pressure cylinder and piston for moving one of the glass-shaping members, a valve mechanism controlling the inlet and exhaust ports of the cylinder, and means automatically operative at a predetermined pressure for shifting said valve to close the inlet and open the exhaust port, whereby pressure in the cylinder is released, substantially as set forth.

In testimony whereof I have hereunto set my hand.

HALBERT K. HITCHCOCK.

Witnesses:
F. E. GAITHER,
DARWIN S. WOLCOTT.